W. H. THOMPSON.
NUT LOCK.
APPLICATION FILED MAR. 1, 1916.
1,201,651.
Patented Oct. 17, 1916.
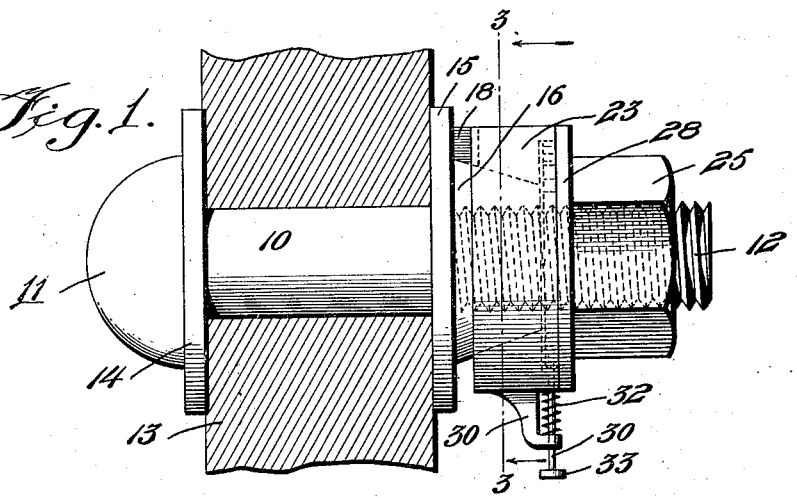
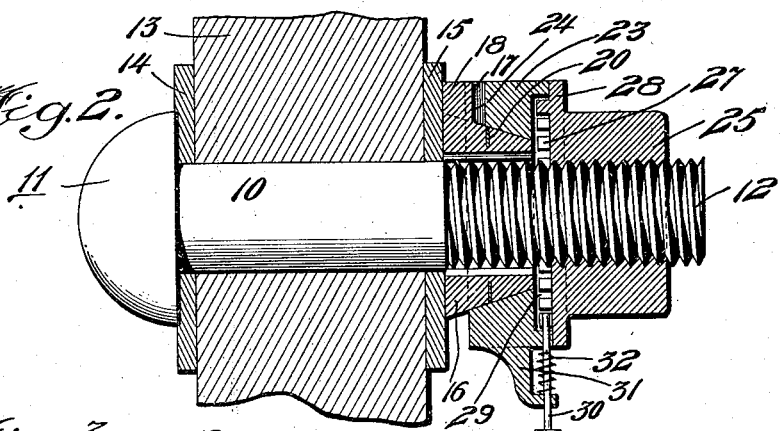
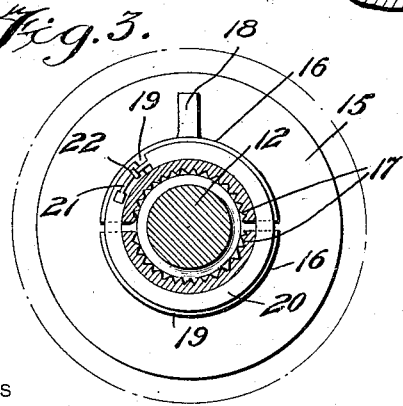
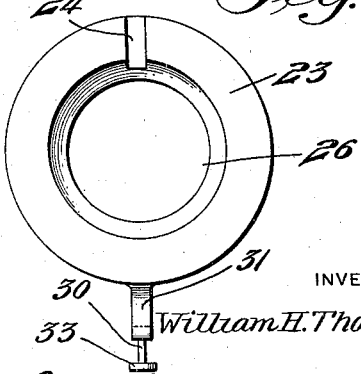
WITNESSES
INVENTOR
William H. Thompson
BY
ATTORNEY

UNITED STATES PATENT OFFICE.

WILLIAM H. THOMPSON, OF BALTIMORE, MARYLAND.

NUT-LOCK.

1,201,651.  Specification of Letters Patent.  Patented Oct. 17, 1916.

Application filed March 1, 1916. Serial No. 81,482.

*To all whom it may concern:*

Be it known that I, WILLIAM H. THOMPSON, a citizen of the United States, residing at Baltimore, in the State of Maryland, have invented certain new and useful Improvements in Nut-Locks, of which the following is a specification.

This invention relates to an improved nut lock and the principal object of the invention is to provide a nut lock which is so constructed that a clamping collar may be securely held in superposed relation upon a gripping device, the securing nut for moving the clamping collar to an operative position being releasably held in place by means of a spring-held latch carried by the collar.

Another object of the invention is to provide an improved type of thread gripper formed of a plurality of parts yieldably held about the bolt and having interlocking engagement with the collar to prevent rotary movement of the collar.

Another object of the invention is to provide a nut lock having securing features producing a very secure lock which however may be released when desired.

Another object of the invention is to provide a nut lock which will be strong and durable and comprise a relatively few number of parts not liable to easily break or get out of order.

This invention is illustrated in the accompanying drawings, wherein:—

Figure 1 is a view showing the improved nut lock in elevation, Fig. 2 is a view somewhat similar to Fig. 1, the locking element and nut being shown in section and the bolt in elevation, Fig. 3 is a view taken along the line 3—3 of Fig. 1, and Fig. 4 is a view looking from the inner end of the clamping collar.

The bolt 10 is provided with the usual head 11 and threaded portion 12 and is passed through the beam 13, washers 14 and 15 being placed upon the bolt as shown in Figs. 1 and 2. The thread gripper is conical-shaped and includes the two sections 16, each of which is provided with longitudinally extending internal teeth 17 and one of which is provided with a lug 18. These sections are further provided with an annular groove 19 forming a seat for the spring 20 which serves to yieldably hold the sections of the gripper in position about the bolt. This spring 20 is provided at one end with a reduced extension or pin 21 which passes through the eye 22 and permits movement of the spring without the end portion thereof becoming entirely disconnected. Therefore the sections of the thread gripper can be moved relative to each other and when released will return to their original positions for engagement with the threads of the bolt. In the drawing this gripping device has been shown formed of two sections but it is understood that any suitable number could be provided. It is also understood that if desired more than one spring 20 could be provided. After the bolt has been passed through the beam and the washer 15 put in place, the thread gripper is slipped upon the bolt and moved into engagement with the washer. The clamping collar 23 is then slipped upon the gripper with the lug 18 fitting into the socket or notch 24 as shown in Fig. 2. Therefore the clamping collar can move longitudinally of the bolt but cannot rotate when the nut 25 is screwed tightly into place. The passageway 26 through this clamping collar is tapered to fit upon the tapered or conical thread gripper and when this clamping collar is forced toward the washer 15, the thread gripper will be forced into very tight engagement with the bolt, the teeth 17 of the sections 16 biting into the threads of the bolt and preventing rotation of the thread gripper and collar.

In order to releasably prevent rotation of the nut 25, there has been provided teeth 27 upon the inner face of the flange 28 which teeth fit into a recess or pocket 29 in the clamping collar. These teeth are engaged by the securing pin 30 which pin is slidably supported by the bearing bracket 31 and yieldably held in an operative position as shown in Fig. 2 by means of the springs 32. A head 33 is provided at the outer end of this locking pin so that this pin may be easily drawn outwardly out of engagement with the teeth 27 and permit the nut to be removed.

The operation of this nut lock is very simple, the thread gripper being first put in place and the clamping collar then passed over the end of the nut and fitted upon the thread gripper. After the clamping collar is in place, the securing nut 25 is screwed upon the bolt and will engage the clamping collar to force it to the position shown in Fig. 2 thus forcing the teeth 17 of the thread gripper into tight engagement with the threads of the bolt. The pin 30 can be drawn outwardly while the nut is being tightened or if desired the teeth 28 can be so cut that they will ride past this pin when the nut is tightened but be prevented from doing so in case the nut has any tendency to move in the opposite direction. When it is desired to remove the bolt, the pin 30 is drawn outwardly and the nut can be easily loosened and removed. The clamping collar and thread gripper can then be removed and the bolt withdrawn. I have therefore provided a nut lock which is comparatively simple in construction but at the same time very effective in use, it being tightly held in place but at the same time permitting of easy removal when desired.

What is claimed is:—

1. A nut lock comprising a bolt, a thread gripper fitting upon said bolt and formed of a plurality of sections having thread engaging teeth, the thread gripper being provided with an annular groove forming a seat, a spring band fitting within the seat to yieldably hold the sections in engagement, a clamping collar fitting upon said thread gripper, means for preventing rotary movement of said clamping collar, a securing nut screwed upon said bolt and engaging said clamping collar, and means providing a locking engagement between said clamping collar and nut to prevent rotation of the nut upon the bolt.

2. A nut lock comprising a bolt, a thread gripper fitting upon said bolt and formed of a plurality of sections provided with an annular groove forming a seat, a resilient band fitting in said seat and having its end portions slidably connected for permitting expansion and contraction of the thread gripper, a clamping collar fitting upon said thread gripper and held against rotary movement thereon, a securing nut screwed upon said bolt and engaging said clamping collar, and means for locking said bolt to said clamping collar.

3. A nut lock comprising a bolt, a thread gripper fitting upon said bolt and formed of a plurality of sections, resilient means yieldably holding the sections in engagement, a clamping collar fitting upon said thread gripper and held against rotary movement thereon, and a securing nut screwed upon said bolt and having interlocking engagement with said clamping collar.

In testimony whereof I affix my signature in presence of two witnesses.

WILLIAM H. THOMPSON.

Witnesses:
CARLOS C. JENNINGS,
WM. C. MCCARD.